(12) United States Patent
Bian (10) Patent No.: US 11,892,680 B2
(45) Date of Patent: Feb. 6, 2024

(54) EDGE COUPLERS WITH A HIGH-ELEVATION ASSISTANCE FEATURE

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 37 days.

(21) Appl. No.: 17/853,186

(22) Filed: Jun. 29, 2022

(65) Prior Publication Data

US 2024/0004140 A1 Jan. 4, 2024

(51) Int. Cl.
*G02B 6/30* (2006.01)
*G02B 6/122* (2006.01)
*G02B 6/13* (2006.01)
*G02B 6/12* (2006.01)

(52) U.S. Cl.
CPC ........... *G02B 6/305* (2013.01); *G02B 6/1228* (2013.01); *G02B 6/13* (2013.01); *G02B 2006/12061* (2013.01); *G02B 2006/12121* (2013.01)

(58) Field of Classification Search
CPC .................................. G02B 6/30; G02B 6/305
See application file for complete search history.

(56) References Cited

U.S. PATENT DOCUMENTS

| | | | | |
|---|---|---|---|---|
| 3,785,717 | A * | 1/1974 | Croset | G02B 6/12002 385/132 |
| 10,663,663 | B2 * | 5/2020 | Painchaud | G02B 6/1228 |
| 11,215,756 | B2 | 1/2022 | Bian et al. | |
| 2002/0154879 | A1 * | 10/2002 | Yasuda | G02B 6/4214 385/132 |
| 2011/0116741 | A1 * | 5/2011 | Cevini | G02B 6/305 385/28 |
| 2012/0163750 | A1 * | 6/2012 | Chen | B29D 11/00644 385/11 |
| 2016/0103279 | A1 * | 4/2016 | Budd | G02B 6/12004 438/31 |
| 2018/0164501 | A1 * | 6/2018 | Norberg | G02B 6/1228 |

(Continued)

FOREIGN PATENT DOCUMENTS

| | | | |
|---|---|---|---|
| DE | 4308510 A1 * | 9/1994 | |
| EP | 2905641 A1 | 8/2015 | |
| WO | 2017124032 A1 | 7/2017 | |

OTHER PUBLICATIONS

Bian, Yusheng "Edge Couplers With Metamaterial Rib Features" filed Jul. 7, 2021 as a U.S. Appl. No. 17/369,253.

(Continued)

*Primary Examiner* — Michael Stahl
(74) *Attorney, Agent, or Firm* — Thompson Hine LLP; Anthony Canale (57) ABSTRACT

Structures for an edge coupler and methods of fabricating a structure for an edge coupler. The structure comprises an edge coupler including a first waveguide core and a second waveguide core. The first waveguide core is positioned in a vertical direction between the second waveguide core and a substrate. The first waveguide core has a first longitudinal axis, the second waveguide core has a second longitudinal axis, and the second longitudinal axis of the second waveguide core is slanted at an angle relative to the first longitudinal axis of the first waveguide core.

20 Claims, 9 Drawing Sheets

(56) References Cited

U.S. PATENT DOCUMENTS

| | | | |
|---|---|---|---|
| 2019/0235171 A1* | 8/2019 | Brusberg | G02B 6/245 |
| 2019/0293881 A1* | 9/2019 | Chen | G02B 6/12007 |
| 2022/0043207 A1 | 2/2022 | Bian | |
| 2022/0146749 A1 | 5/2022 | Bandyopadhyay et al. | |

OTHER PUBLICATIONS

Bian, Yusheng "Edge Couplers With Confining Features" filed Oct. 4, 2021 as a U.S. Appl. No. 17/493,260.

Bian, Yusheng et al. "Confining Features for Mode Shaping of Lasers and Coupling With Silicon Photonic Components" filed Feb. 4, 2021 as a U.S. Appl. No. 17/167,201.

Bian, Yusheng et al., "Metamaterial Edge Couplers in the Back-End-Of-Line Stack of a Photonics Chip" filed Feb. 11, 2021 as a U.S. Appl. No. 17/173,639.

Bian, Yusheng et al., "Spot-Size Converters With Angled Facets" filed Feb. 24, 2022 as a U.S. Appl. No. 17/679,188.

G. Roelkens, D. Van Thourhout, R. Baets, R. Nötzel, and M. Smit, "Laser emission and photodetection in an InP/InGaAsP layer integrated on and coupled to a Silicon-on-Insulator waveguide circuit," Opt. Express 14, 8154-8159 (2006).

Zhongfa Liao, S. J. Wagner, M. Z. Alam, V. Tolstikhin, and J. Stewart Aitchison, "Vertically integrated spot-size converter in AlGaAs—GaAs," Opt. Lett. 42, 4167-4170 (2017).

Tu, Yi-Chou et al., "High-Efficiency Ultra-Broadband Multi-Tip Edge Couplers for Integration of Distributed Feedback Laser With Silicon-on-Insulator Waveguide," in IEEE Photonics Journal, vol. 11, No. 4, pp. 1-13, Aug. 2019, doi: 10.1109/JPHOT.2019.2924477 (Aug. 2019).

N. Hatori et al., "A Hybrid Integrated Light Source on a Silicon Platform Using a Trident Spot-Size Converter," in Journal of Lightwave Technology, vol. 32, No. 7, pp. 1329-1336, doi: 10.1109/JLT.2014.2304305 (Apr. 1, 2014).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, doi: 10.1109/JSTQE.2019.2908790.

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group), paper T3H.3 (2020).

Bian, Yusheng et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group), paper FW5D.2 (2020).

Bian, Yusheng et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group), paper M5A.2 (2021).

Bian, Yusheng et al., "3D Integrated Laser Attach Technology on 300-mm Monolithic Silicon Photonics Platform," 2020 IEEE Photonics Conference (IPC), 2020, pp. 1-2, doi: 10.1109/IPC47351.2020.9252280.

Bian, Yusheng et al., "Integrated Laser Attach Technology on a Monolithic Silicon Photonics Platform," 2021 IEEE 71st Electronic Components and Technology Conference (ECTC), 2021, pp. 237-244, doi: 10.1109/ECTC32696.2021.00048.

B. Peng et al., "A CMOS Compatible Monolithic Fiber Attach Solution with Reliable Performance and Self-alignment," in Optical Fiber Communication Conference (OFC), OSA Technical Digest (Optica Publishing Group, 2020), paper Th3I.4 (2020).

Bian, Yusheng et al., "Monolithically integrated silicon nitride platform," 2021 Optical Fiber Communications Conference and Exhibition (OFC), pp. 1-3, Th1A.46 (2021).

A. Aboketaf et al., "Towards fully automated testing and characterization for photonic compact modeling on 300-mm wafer platform," 2021 Optical Fiber Communications Conference and Exhibition (OFC), 2021, pp. 1-3.

European Patent Office, Extended European Search Report and Written Opinion issued in European Patent Application No. 22204088.3 dated Aug. 28, 2023 (8 pages).

* cited by examiner

EDGE COUPLERS WITH A HIGH-ELEVATION ASSISTANCE FEATURE

BACKGROUND

The disclosure relates to photonics chips and, more specifically, to structures for an edge coupler and methods of fabricating a structure for an edge coupler.

Photonics chips are used in many applications and systems including, but not limited to, data communication systems and data computation systems. A photonics chip integrates optical components and electronic components into a unified platform. Among other factors, layout area, cost, and operational overhead may be reduced by the integration of both types of components on the same chip.

An edge coupler, also known as a spot-size converter, is an optical component that is commonly used for coupling light of a given mode from a light source, such as a laser or an optical fiber, to other optical components on the photonics chip. The edge coupler may include a section of a waveguide core that defines an inverse taper having a tip. In the edge coupler construction, the narrow end of the inverse taper provides a facet at the tip that is positioned adjacent to the light source, and the wide end of the inverse taper is connected to another section of the waveguide core that routes the light to the optical components of the photonics chip.

The gradually-varying cross-sectional area of the inverse taper supports mode transformation and mode size variation associated with mode conversion when light is transferred from the light source to the edge coupler. The tip of the inverse taper is unable to fully confine the incident mode received from the light source because the cross-sectional area of the tip is considerably smaller than the mode size. Consequently, a significant percentage of the electromagnetic field of the incident mode is distributed about the tip of the inverse taper. As its width increases, the inverse taper can support the entire incident mode and confine the electromagnetic field.

Improved structures for an edge coupler and methods of fabricating a structure for an edge coupler are needed.

SUMMARY

In an embodiment of the invention, a structure comprises an edge coupler including a first waveguide core and a second waveguide core. The first waveguide core is positioned in a vertical direction between the second waveguide core and a substrate. The first waveguide core has a first longitudinal axis, the second waveguide core has a second longitudinal axis, and the second longitudinal axis of the second waveguide core is slanted at an angle relative to the first longitudinal axis of the first waveguide core.

In an embodiment of the invention, a method of forming a structure for an edge coupler is provided. The method comprises forming a first waveguide core having a first longitudinal axis, and forming a second waveguide core having a second longitudinal axis that is slanted at an angle relative to the first longitudinal axis of the first waveguide core. The first waveguide core is positioned in a vertical direction between the second waveguide core and a substrate.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
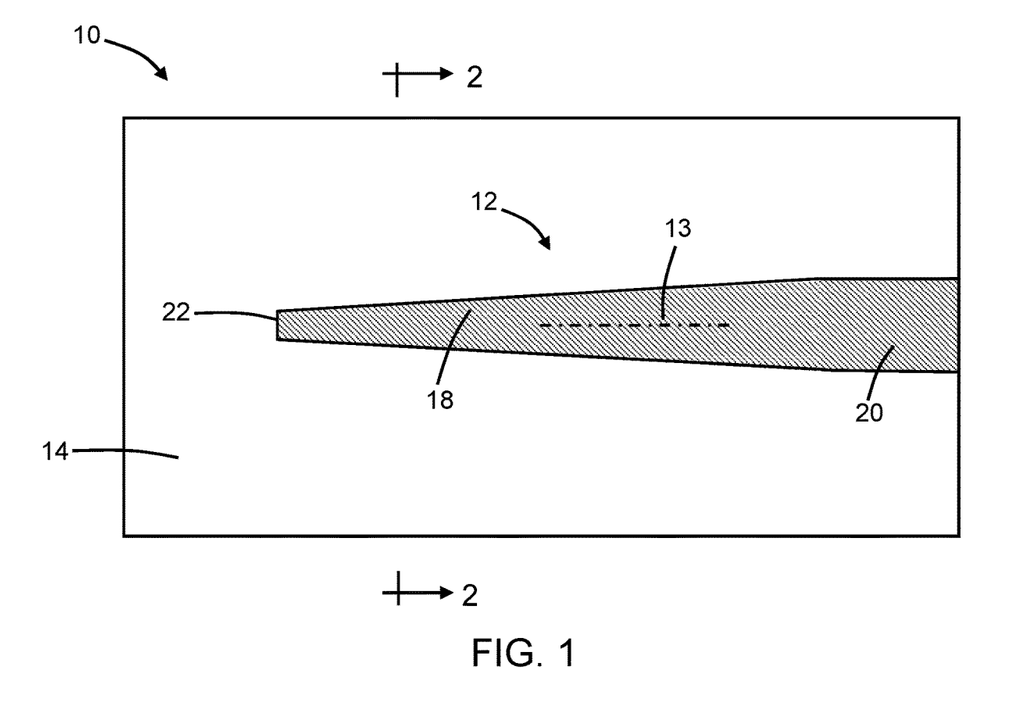
FIG. 1 is a top view of a structure at an initial fabrication stage of a processing method in accordance with embodiments of the invention.
Figure 2:
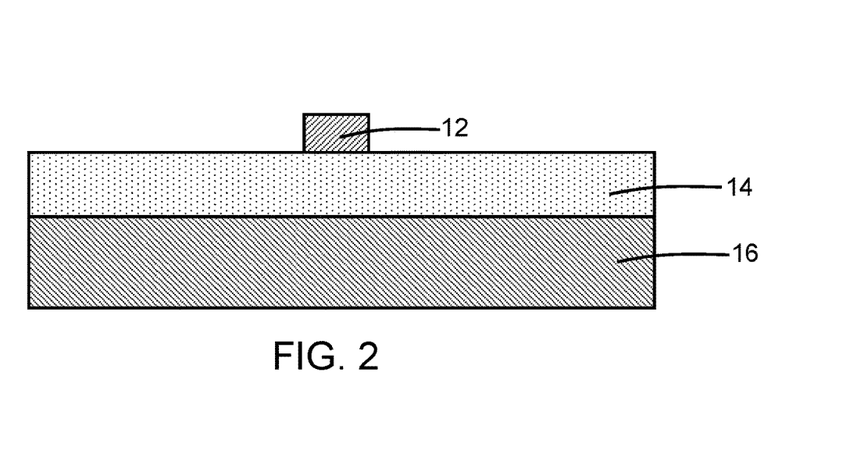
FIG. 2 is a cross-sectional view taken generally along line 2-2 in FIG. 1.

With reference to FIGS. 1, 2 and in accordance with embodiments of the invention, a structure 10 includes a waveguide core 12 that is positioned over a dielectric layer 14 and a substrate 16. In an embodiment, the dielectric layer 14 may be comprised of a dielectric material, such as silicon dioxide, and the substrate 16 may be comprised of a semiconductor material, such as single-crystal silicon. In an embodiment, the dielectric layer 14 may be a buried oxide layer of a silicon-on-insulator substrate, and the dielectric layer 14 may separate the waveguide core 12 from the substrate 16. In an alternative embodiment, an additional dielectric layer comprised of a dielectric material, such as silicon dioxide, may be positioned between the dielectric layer 14 and the waveguide core 12.

The waveguide core 12 may include a tapered section 18, a section 20 connected to the tapered section 18, and an end surface 22 that terminates the tapered section 18. The waveguide core 12 may be lengthwise aligned along a longitudinal axis 13. In an embodiment, the tapered section 18 may increase in width dimension with increasing distance along the longitudinal axis 13 from the end surface 22. The section 20 of the waveguide core 12 may be connected to other optical components.

In an embodiment, the waveguide core 12 may be comprised of a material having a refractive index that is greater than the refractive index of silicon dioxide. In an embodiment, the waveguide core 12 may be comprised of a semiconductor material, such as single-crystal silicon. In an alternative embodiment, the waveguide core 12 may be comprised of a dielectric material, such as silicon nitride or silicon oxynitride. In alternative embodiments, other materials, such as a polymer or a III-V compound semiconductor, may be used to form the waveguide core 12.

In an embodiment, the waveguide core 12 may be formed by patterning a layer of material with lithography and etching processes. In an embodiment, the waveguide core 12 may be formed by patterning the semiconductor material (e.g., single-crystal silicon) of a device layer of a silicon-on-insulator substrate. In an embodiment, the waveguide core 12 may be formed by patterning a deposited layer of a material (e.g., silicon nitride). In an embodiment, the sidewalls of the waveguide core 12 may be vertical or substantially vertical. In an alternative embodiment, the sidewalls of the waveguide core 12 may be inclined to define a trapezoidal shape in a direction parallel to the longitudinal axis 13.

Figure 3:
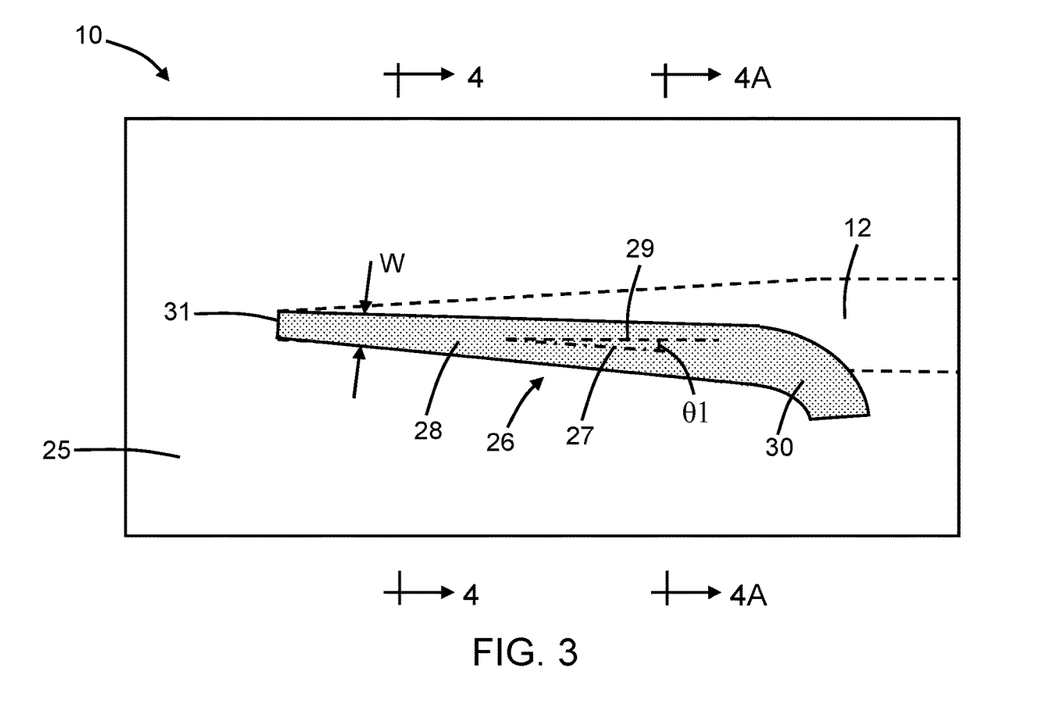
FIG. 3 is a top view of the structure at a fabrication stage of the processing method subsequent to FIG. 1.
Figure 4:
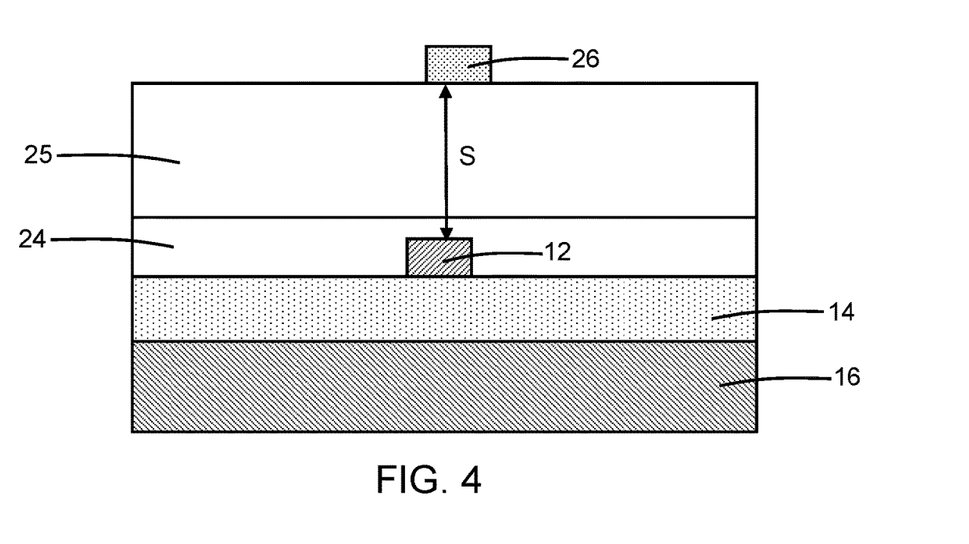
FIG. 4 is a cross-sectional view taken generally along line 4-4 in FIG. 3.
Figure 4A:
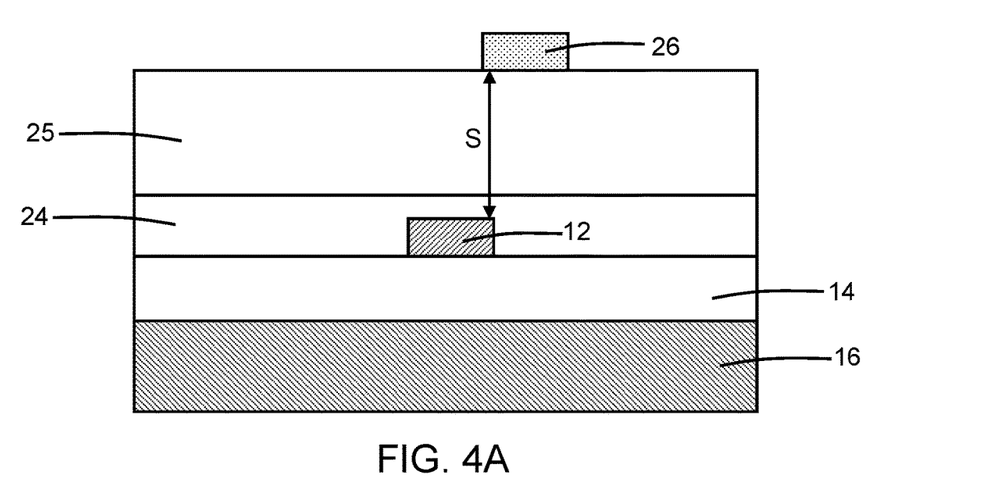
FIG. 4A is a cross-sectional view taken generally along line 4A-4A in FIG. 3.

With reference to FIGS. 3, 4, 4A in which like reference numerals refer to like features in FIGS. 1, 2 and at a subsequent fabrication stage, dielectric layers 24, 25 are formed over the waveguide core 12. The dielectric layers 24, 25 may each be comprised of a deposited dielectric material, such as silicon dioxide. The waveguide core 12 is embedded in the dielectric layer 24, which may be planarized after deposition, because the dielectric layer 24 is thicker than the height of the waveguide core 12. The thickness of the dielectric layer 24 and the height of the waveguide core 12 may be adjustable variables. The dielectric materials constituting the dielectric layers 24, 25 may have a lower refractive index than the dielectric material constituting the waveguide core 12.

The structure 10 may further include a waveguide core 26 that is positioned over the dielectric layer 25 and in a different elevation or level within the structure 10 than the waveguide core 12. The waveguide core 26 may include a tapered section 28, a section 30 connected to the tapered section 28, and an end surface 31 that terminates the tapered section 28. The tapered section 28 of the waveguide core 26 may be lengthwise aligned along a longitudinal axis 27. In an embodiment, the section 30 may terminate the waveguide core 26 at an end that is opposite from the end surface 31. In an embodiment, the section 30 may be curved to define a bend. In an embodiment, the section 30 may curve away from the underlying waveguide core 12. The waveguide core 26 is spaced in a vertical direction above the waveguide core 12 by a spacing or distance S. In an embodiment, the distance S may be in a range of 500 nanometers to 1.5 microns.

The tapered section 28 of the waveguide core 26 may have a width dimension W that longitudinally increases with increasing distance from the end surface 31. In an embodiment, the width dimension W of the tapered section 28 may linearly increase with increasing distance from the end surface 31. In an alternative embodiment, the width dimension W of the tapered section 28 may increase based on a non-linear function, such as a quadratic function, a cubic function, a parabolic function, a sine function, a cosine function, a Bezier function, or an exponential function. In an embodiment, the tapered section 28 may have a single taper angle as a result of the increasing width. In an alternative embodiment, the tapered section 28 may taper in multiple stages each having a different taper angle.

The waveguide core 26 may be comprised of a material having a refractive index that is greater than the refractive index of silicon dioxide. In an embodiment, the waveguide core 26 may be comprised of a dielectric material, such as silicon nitride or silicon oxynitride. In alternative embodiments, other materials, such as a polymer or a III-V compound semiconductor, may be used to form the waveguide core 26. In an embodiment, the waveguide core 26 may be formed by depositing a layer of its constituent material on the dielectric layer 14 and patterning the deposited layer with lithography and etching processes. In an embodiment, the sidewalls of the waveguide core 26 may be vertical or substantially vertical. In an alternative embodiment, the sidewalls of the waveguide core 26 may be inclined to define a trapezoidal shape in a direction parallel to the longitudinal axis 27.

In an alternative embodiment, a slab layer may be connected to a lower portion of the waveguide core 26. The slab layer may be formed when the waveguide core 26 is patterned, and the slab layer, which is positioned on the dielectric layer 25, has a thickness that is less than the thickness of the waveguide core 26.

The longitudinal axis 27 of the waveguide core 26 is not aligned parallel to the longitudinal axis 13 of the waveguide core 12. Instead, the longitudinal axis 27 of the waveguide core 26 is slanted at an angle θ1 to the longitudinal axis 13 of the waveguide core 12, which is aligned parallel to the dashed line 29 shown in FIG. 3. In an embodiment, the angle θ1 is greater than 0° and may be an acute angle. The overlap between the waveguide core 26 and the waveguide core 12 may be a maximum proximate to the end surface 22, and may be a minimum or nil in the vicinity of the section 30. In an embodiment, the waveguide core 26 and the waveguide core 12 may fully overlap proximate to the end surface 22. The overlap between the waveguide core 26 and the waveguide core 12 may decrease with increasing distance from the end surface 22. The section 30 of the waveguide core 26 may have a non-overlapping relationship with the waveguide core 12.

Figure 5:
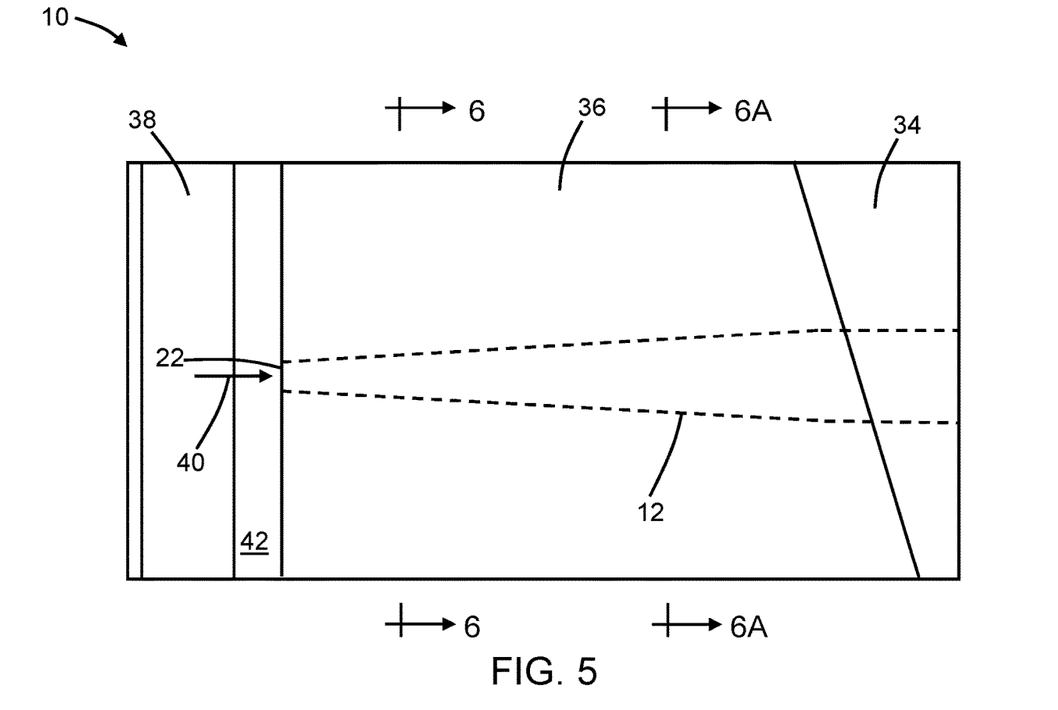
FIG. 5 is a top view of the structure at a fabrication stage of the processing method subsequent to FIG. 3.
Figure 6:
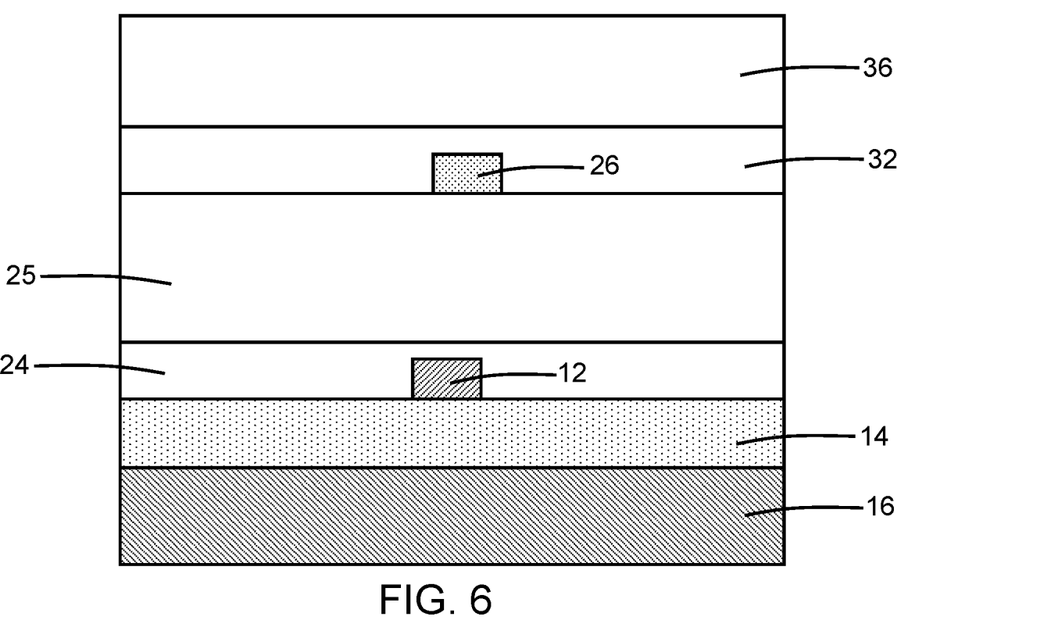
FIG. 6 is a cross-sectional view taken generally along line 6-6 in FIG. 5.
Figure 6A:
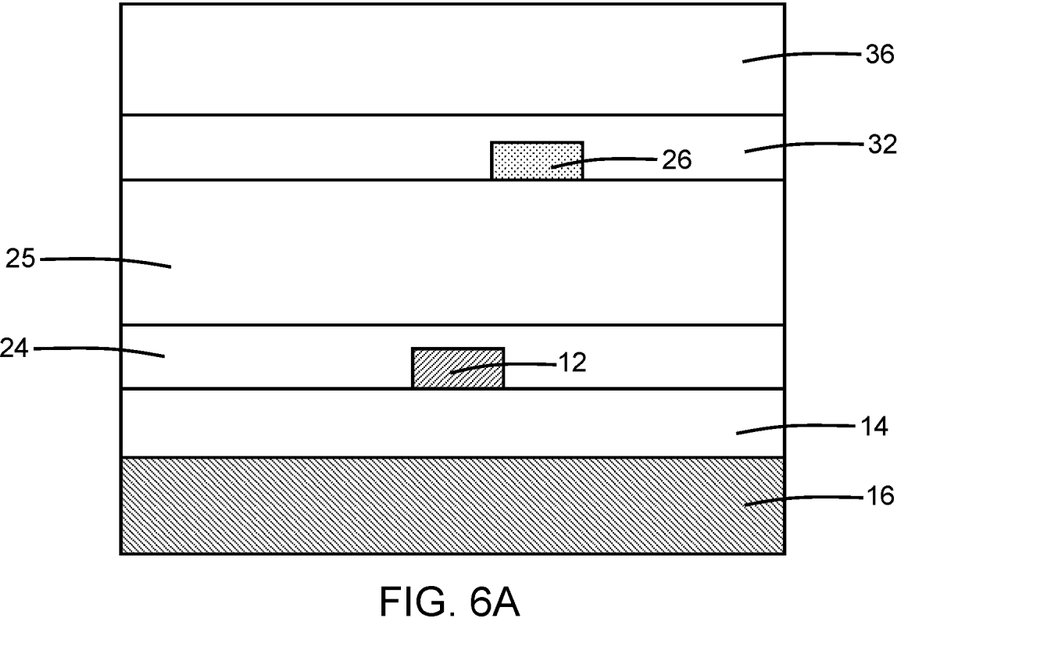
FIG. 6A is a cross-sectional view taken generally along line 6A-6A in FIG. 5.

With reference to FIG. 5, 6, 6A in which like reference numerals refer to like features in FIGS. 3, 4, 4A and at a subsequent fabrication stage, a dielectric layer 32 is deposited over the waveguide core 26 and planarized by chemical-mechanical polishing. The dielectric layer 32 may be comprised of a dielectric material, such as silicon dioxide, having a refractive index that is less than the refractive index of the material constituting the waveguide core 26.

A back-end-of-line stack 34 may be formed over the dielectric layer 32. The back-end-of-line stack 34 may include stacked dielectric layers that are each comprised of a dielectric material, such as silicon dioxide, silicon nitride, tetraethylorthosilicate silicon dioxide, or fluorinated-tetraethylorthosilicate silicon dioxide. The back-end-of-line stack 34 may be removed from above the tapered section 18 of the waveguide core 12 and the waveguide core 26, and replaced by a dielectric layer 36 comprised of a homogeneous dielectric material, such as silicon dioxide. The back-end-of-line stack 34 and the dielectric layer 36 may adjoin along a diagonal interface. The waveguide core 26 is embedded in the dielectric layer 32, which has a thickness greater than the thickness of the waveguide core 26.

A light source 38 may provide light (e.g., emit laser light) in a mode propagation direction 40 toward an edge coupler including the waveguide core 12 and the waveguide core 26.

The light may have a given wavelength, intensity, mode shape, and mode size, and the edge coupler may provide spot size conversion for the light. The space between the edge coupler and the light source 38 may be filled by air or by an index-matching material, such as an adhesive. The light source 38 may be positioned in a cavity 42 formed in the substrate 16. In an embodiment, the light source 38 may be a semiconductor laser diode positioned adjacent to the end surface 22 of the tapered section 18 of the waveguide core 12, and the semiconductor laser diode may be attached inside the cavity 42. In an alternative embodiment, the light source 38 may be a semiconductor optical amplifier. In an alternative embodiment, the light source 38 may be a single-mode or multi-mode optical fiber that is positioned in the cavity 42 adjacent to the end surface 22 of the tapered section 18 of the waveguide core 12. In an alternative embodiment, the cavity 42 may extend as an undercut in the substrate 16 beneath the tapered section 18 of the waveguide core 12.

An edge coupler including the waveguide core 12 and the waveguide core 26 may be positioned at an edge of a photonics chip for coupling light from either a semiconductor laser diode or an optical fiber. The waveguide core 26 may provide a high-elevation assistance feature that enhances the light coupling to the waveguide core 12 such that the optical coupling loss is reduced.

Figure 7:
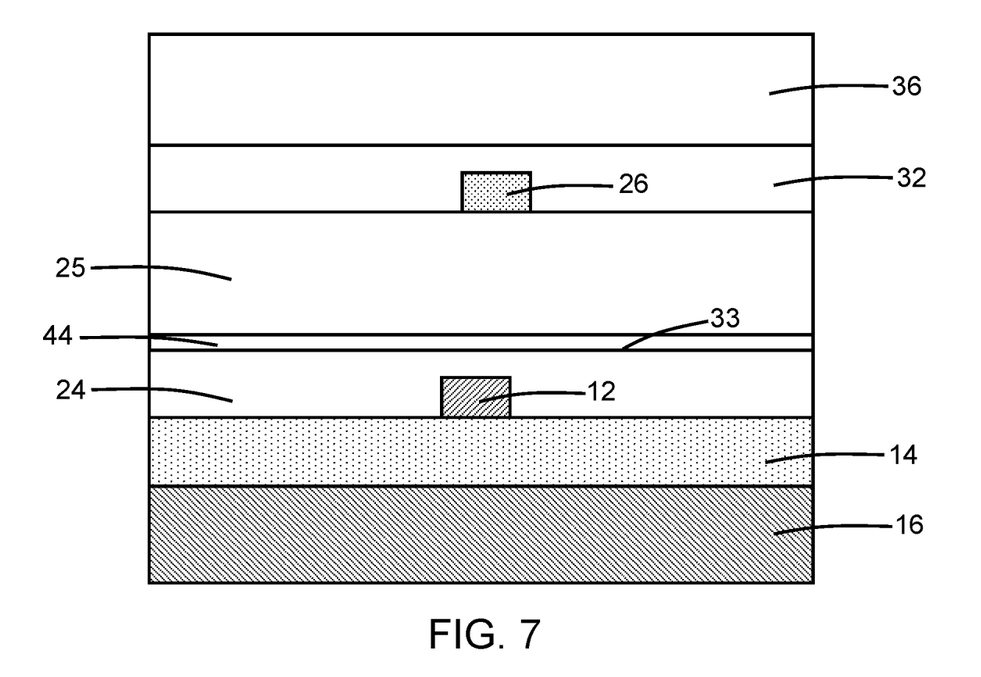
FIG. 7 is a cross-sectional view of a structure in accordance with alternative embodiments of the invention.

With reference to FIG. 7 and in accordance with alternative embodiments, a slab layer 44 may be formed over a top surface 33 of the dielectric layer 24 and above the tapered section 18 of the waveguide core 12. The slab layer 44 is positioned in a vertical direction between the waveguide core 26 and the tapered section 18 of the waveguide core 12. The slab layer 44 may be comprised of a dielectric material, such as silicon nitride. In an embodiment, the slab layer 44 may be a planar layer that fully overlaps with the tapered section 18 of the waveguide core 12. In an embodiment, the slab layer 44 may extend into the back-end-of-line stack 34. In an embodiment, the slab layer 44 may be spaced in a vertical direction by a distance of approximately 25 nanometers from the waveguide core 12. The slab layer 44 is spaced in a vertical direction from the waveguide core 12 by a distance that is significantly less than the distance S (FIGS. 4, 4A) between the waveguide core 26 and the waveguide core 12. Hence, the waveguide core 26 is higher in elevation relative to the waveguide core 12 than the slab layer 44.

Figure 8:
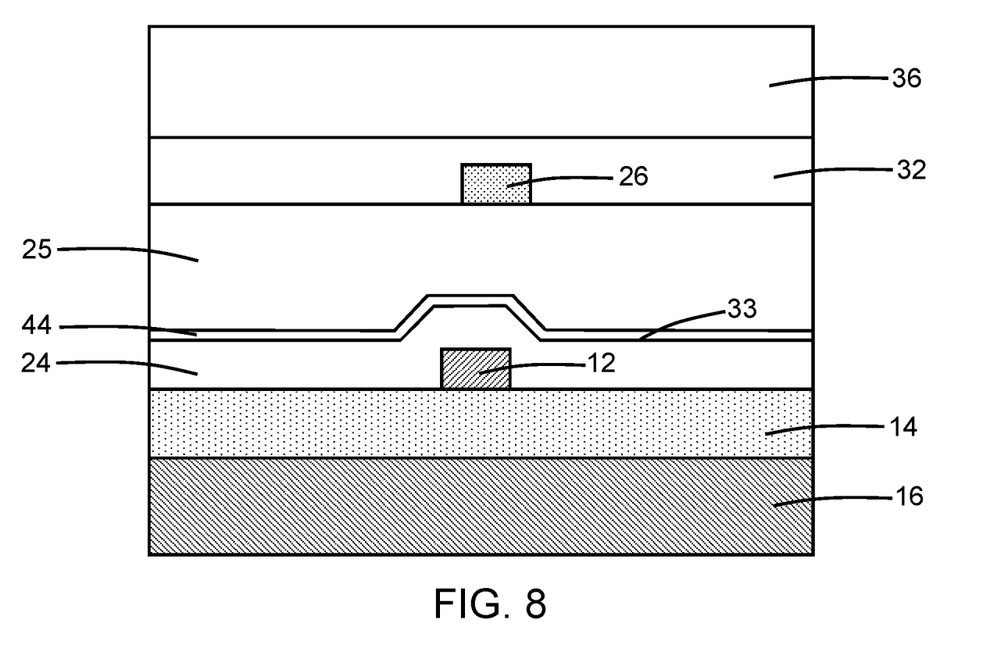
FIG. 8 is a cross-sectional view of a structure in accordance with alternative embodiments of the invention.

With reference to FIG. 8 and in accordance with alternative embodiments, the dielectric layer 24 may be pulled back with an etching process such that the top surface 33 of the dielectric layer 24 has a trapezoidal shape over the tapered section 18 of the waveguide core 12. The slab layer 44 may be deposited with a conformal thickness such that the slab layer 44 has a section with a trapezoidal shape that follows the topography of the trapezoidal shape of the top surface 33 of the dielectric layer 24 above the tapered section 18 of the waveguide core 12. The extent of the pull back of the dielectric layer 32 may determine the rise (i.e., change in elevation) of the trapezoidal shape of the section of the slab layer 44 in a vertical direction over the tapered section 18 of the waveguide core 12. The slab layer 44 is positioned in a vertical direction between the waveguide core 26 and the tapered section 18 of the waveguide core 12. The addition of the trapezoidal section of the slab layer 44 may be effective to further reduce the optical coupling loss.

Figure 9:
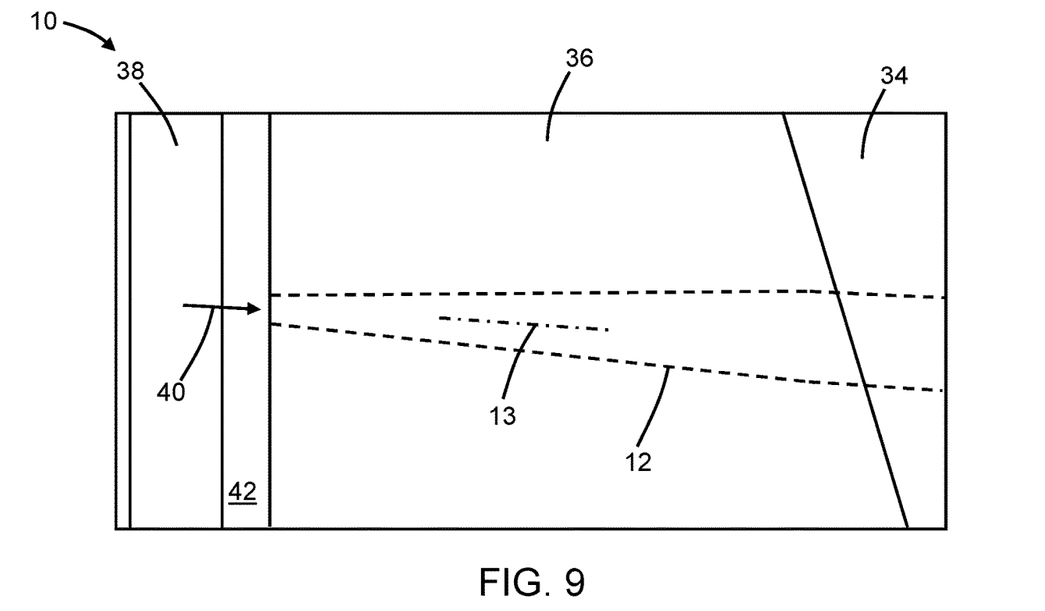
FIGS. 9, 9A are top views of different levels of a structure in accordance with alternative embodiments of the invention.
Figure 9A:
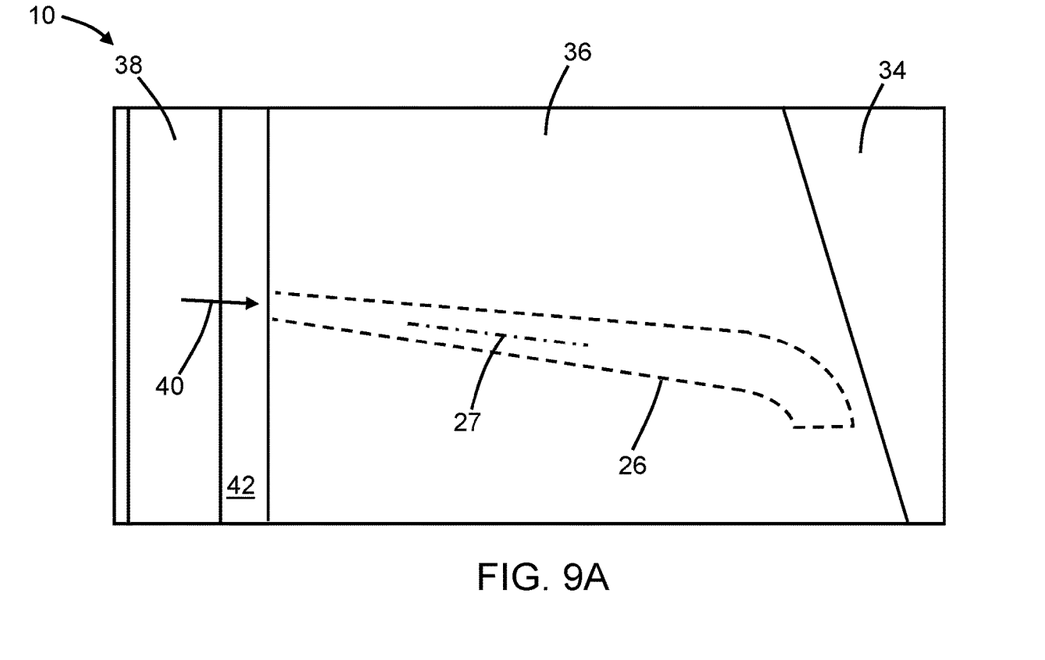

With reference to FIGS. 9, 9A and in accordance with alternative embodiments, the angular orientations of the tapered section 18 of the waveguide core 12 and the tapered section 28 of the waveguide core 26, in a horizontal plane, may each be changed to compensate for angular misalignment of the mode propagation direction 40. For example, the light source 38 may be a semiconductor laser diode that includes a light-emitting laser stripe that is slanted to relative to the edge coupler. The slant of the tapered section 18 of the waveguide core 12 and the slant of the tapered section 28 of the waveguide core 26 may be effective to reduce back reflection to the light source 38.

Figure 10:
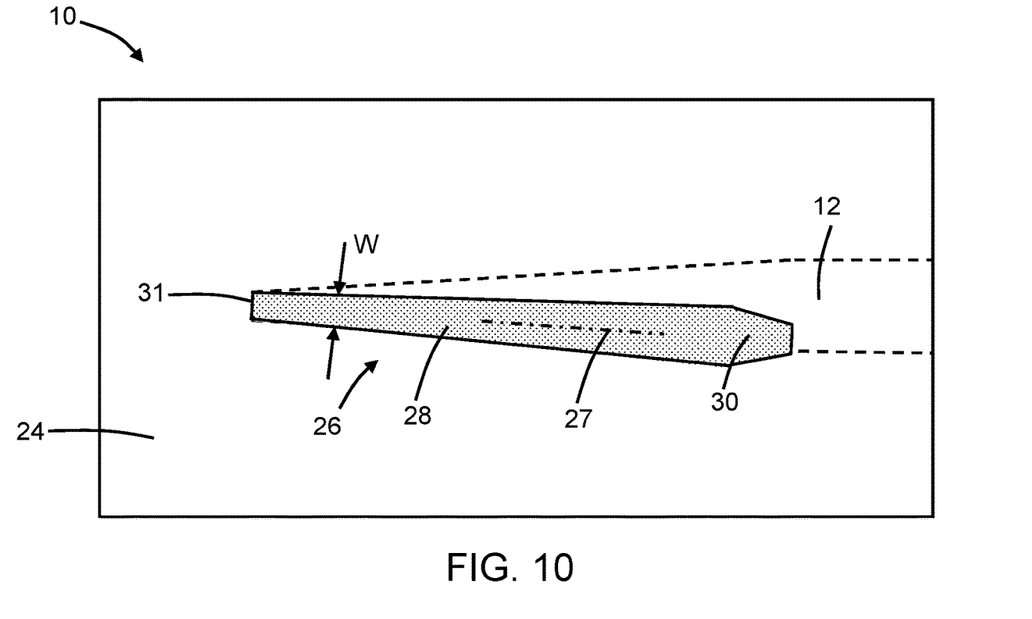
FIG. 10 is a top view of a structure in accordance with alternative embodiments of the invention.

With reference to FIG. 10 and in accordance with alternative embodiments, the section 30 terminating the waveguide core 26 may be tapered instead of a bend. In an embodiment, the section 30 may taper in an opposite direction from the tapered section 28. For example, the width W of the section 30 may decrease with increasing distance from the end surface 31.

Figure 11:
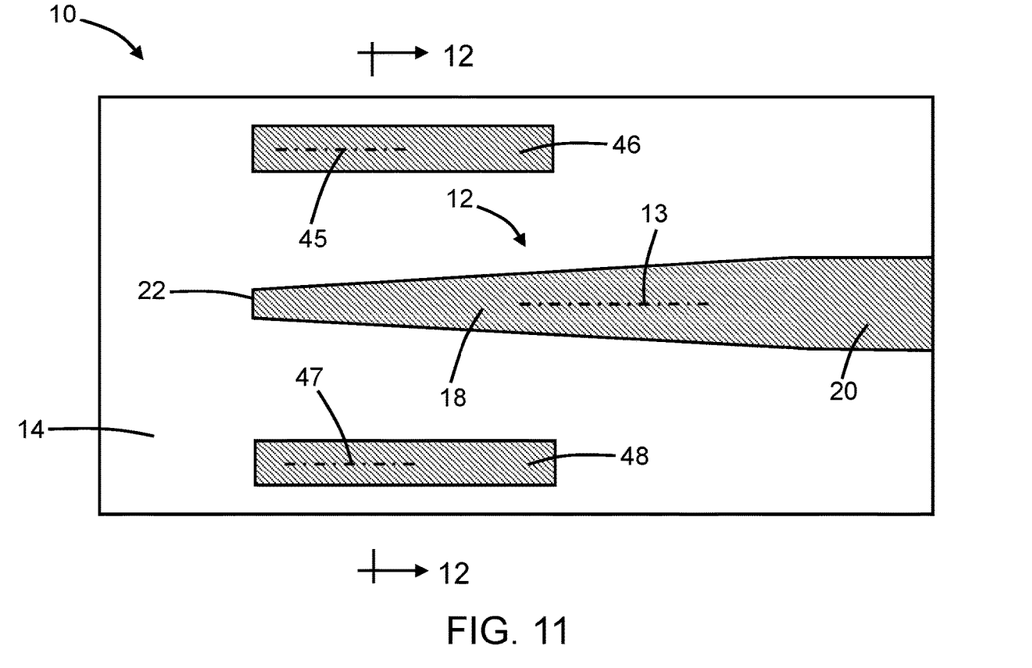
FIG. 11 is a top view of a structure in accordance with alternative embodiments of the invention.
Figure 12:
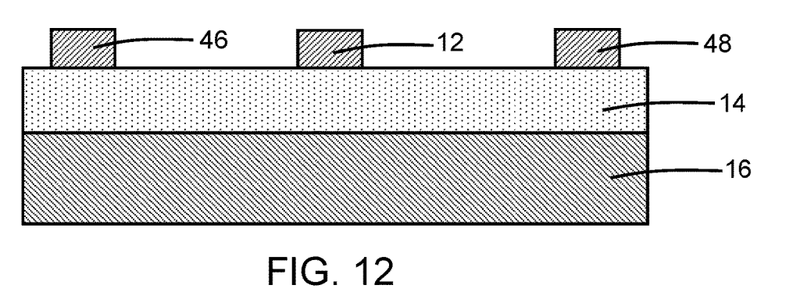
FIG. 12 is a cross-sectional view taken generally along line 12-12 in FIG. 11.

With reference to FIGS. 11, 12 and in accordance with alternative embodiments, additional waveguide cores 46, 48 may be formed on the dielectric layer 14. The waveguide core 46 may be positioned in a lateral direction adjacent to a sidewall of the tapered section 18 of the waveguide core 12, and the waveguide core 48 may be positioned in a lateral direction adjacent to an opposite sidewall of the tapered section 18 of the waveguide core 12. The waveguide cores 46, 48 are truncated at opposite ends. The waveguide cores 46, 48 have be lengthwise aligned along respective longitudinal axes 45, 47, and the longitudinal axis 27 of the waveguide core 26 may be slanted relative to the longitudinal axes 45, 47 at the same angle as the longitudinal axis 13 of the waveguide core 12. The waveguide cores 46, 48 may be formed when the waveguide core 12 is formed and may be comprised of the same material as the waveguide core 12. Processing continues, as described above, to form the waveguide core 26.

Figure 13:
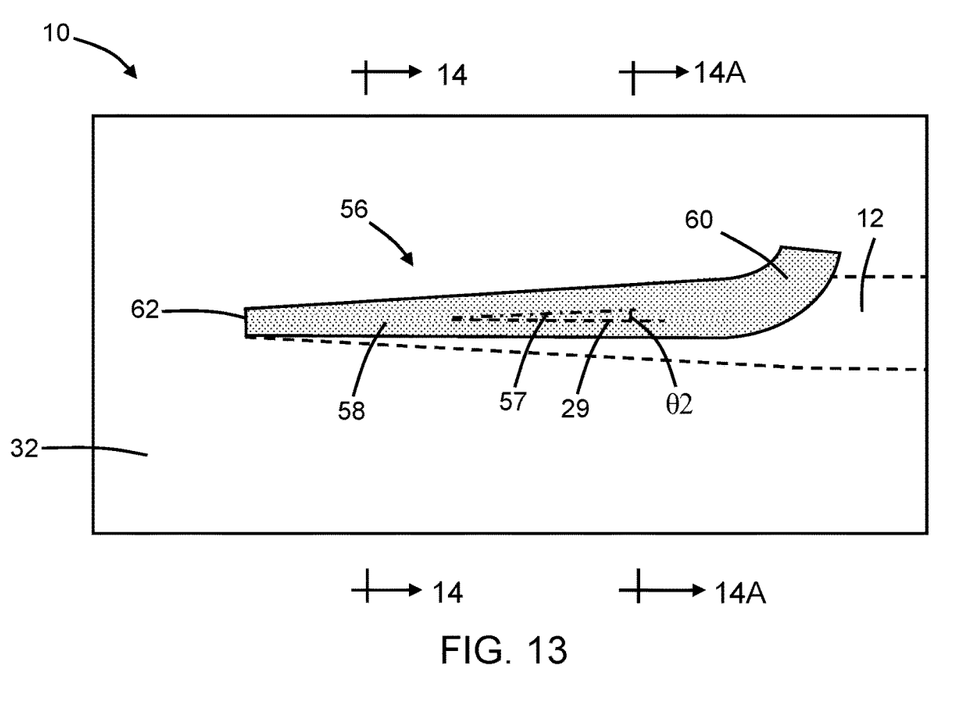
FIG. 13 is a top view of a structure in accordance with alternative embodiments of the invention.
Figure 14:
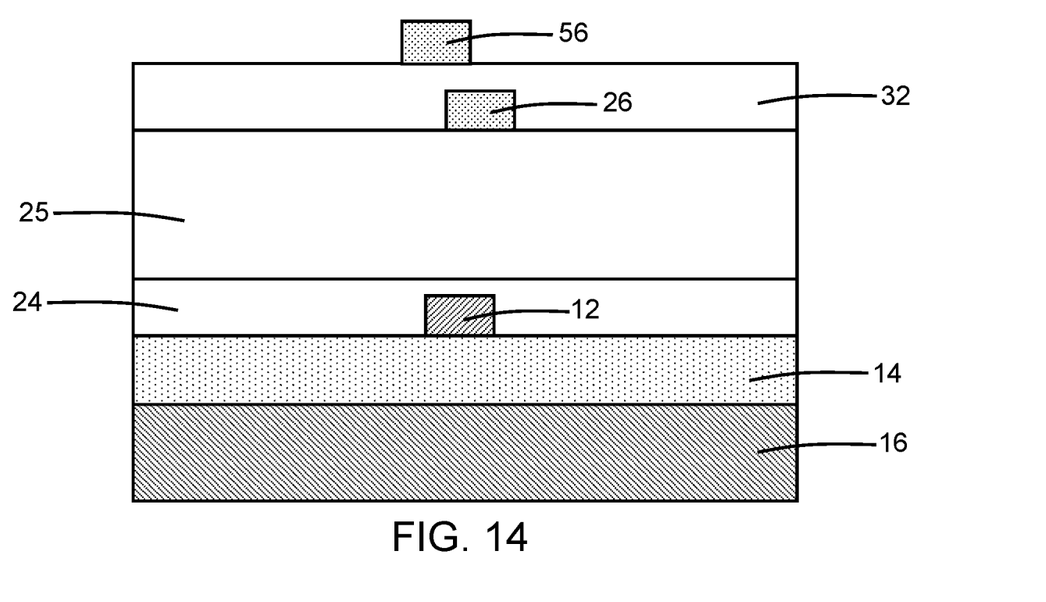
FIG. 14 is a cross-sectional view taken generally along line 14-14 in FIG. 13.
Figure 14A:
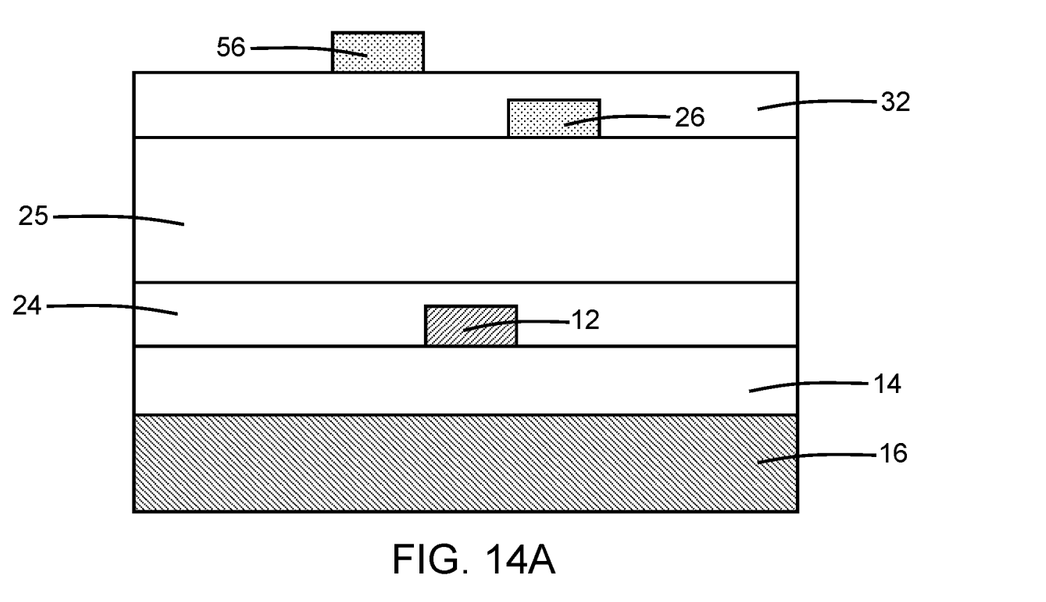
FIG. 14A is a cross-sectional view taken generally along line 14A-14A in FIG. 13.

With reference to FIGS. 13, 14, 14A and in accordance with alternative embodiments, an additional waveguide core 56 similar to the waveguide core 26 may be formed on the dielectric layer 32 over the waveguide core 26 in a stacked arrangement. In an embodiment, the waveguide core 56 may have the same shape as the waveguide core 26. The waveguide core 56 may include a tapered section 58, a section 60 connected to the tapered section 58, and an end surface 62 that terminates the tapered section 58. The tapered section 58 of the waveguide core 56 may be lengthwise aligned along a longitudinal axis 57. In an embodiment, the section 60 may terminate the waveguide core 56 at an end that is opposite from the end surface 62. In an embodiment, the section 60 may be curved to define a bend. In an embodiment, the section 60 may curve away from the underlying waveguide core 12. In an alternative embodiment, the section 60 may be tapered instead of curved. In an embodiment, the end surface 62 may coincide in longitudinal position with the end surface 31 of the waveguide core 26.

The longitudinal axis 57 of the waveguide core 56 is slanted relative to the longitudinal axis 13 of the waveguide core 12 at an angle θ2 the dashed line 29, but in a different rotational direction than the angle θ1 between the longitudinal axis 27 of the waveguide core 26 and longitudinal axis 13 of the waveguide core 12, as shown in FIG. 3. In an embodiment, the longitudinal axis 57 of the waveguide core 56 may be slanted at a positive angle θ2 relative to the longitudinal axis 13, and the longitudinal axis 27 of the waveguide core 26 may be slanted at a negative angle θ1 relative to the longitudinal axis 13. In an alternative embodiment, the longitudinal axis 57 of the waveguide core 56 may be slanted at a negative angle θ2 relative to the longitudinal axis 13, and the longitudinal axis 27 of the waveguide core 26 may be slanted at a positive angle θ1 relative to the longitudinal axis 13. In an embodiment, the absolute value of the angle θ1 may be equal to the absolute value of the angle θ2.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
    a substrate; and
    an edge coupler including a first waveguide core and a second waveguide core, the first waveguide core positioned in a vertical direction between the second waveguide core and the substrate, the second waveguide core including a first section and a second section, the first section of the second waveguide core having an end surface that terminates the second waveguide core and a width dimension that increases with increasing distance from the end surface, the first waveguide core having a first longitudinal axis, the second waveguide core having a second longitudinal axis, the first section of the second waveguide core positioned along the second longitudinal axis between the second section and the end surface of the second waveguide core, and the second longitudinal axis of the second waveguide core slanted at a first angle relative to the first longitudinal axis of the first waveguide core,
    wherein the second section of the second waveguide core is a bend that terminates the second waveguide core adjacent to the end surface of the second waveguide core.

2. The structure of claim 1 wherein the second waveguide core has a partially overlapping relationship with the first waveguide core.

3. A structure comprising:
    a substrate;
    an edge coupler including a first waveguide core and a second waveguide core, the first waveguide core positioned in a vertical direction between the second waveguide core and the substrate, the first waveguide core having a first longitudinal axis, the second waveguide core having a second longitudinal axis, and the second longitudinal axis of the second waveguide core slanted at a first angle relative to the first longitudinal axis of the first waveguide core, the first waveguide core having an end surface; and
    a semiconductor laser positioned adjacent to the end surface of the first waveguide core, the semiconductor laser configured to provide light in a mode propagation direction toward the edge coupler.

4. The structure of claim 3 wherein the semiconductor laser includes a light-emitting layer that is slanted at a second angle, and the first longitudinal axis of the first waveguide core is slanted at a third angle equal to the second angle.

5. The structure of claim 1 wherein the first waveguide core comprises silicon, and the second waveguide core comprises silicon nitride.

6. The structure of claim 1 wherein the first waveguide core comprises silicon nitride, and the second waveguide core comprises silicon nitride.

7. The structure of claim 1 wherein the edge coupler further includes a third waveguide core positioned in a lateral direction adjacent to the first waveguide core, the third waveguide core has a third longitudinal axis, and the third longitudinal axis of the third waveguide core is slanted at the first angle relative to the second longitudinal axis of the second waveguide core.

8. The structure of claim 1 wherein the edge coupler further includes a third waveguide core, the second waveguide core is positioned in the vertical direction between the first waveguide core and the third waveguide core, the third waveguide core has a third longitudinal axis, and the third longitudinal axis of the third waveguide core is slanted at a second angle relative to the first longitudinal axis of the first waveguide core.

9. The structure of claim 8 wherein the first angle is a negative angle, and the second angle is a positive angle.

10. A structure comprising:
    a substrate; and an edge coupler including a first waveguide core and a second waveguide core, the first waveguide core positioned in a vertical direction between the second waveguide core and the substrate, the first waveguide core having a first longitudinal axis, the second waveguide core having a second longitudinal axis, and the second longitudinal axis of the second waveguide core slanted at a first angle relative to the first longitudinal axis of the first waveguide core, wherein the second waveguide core is spaced in the vertical direction above the first waveguide core by a distance in a range of 500 nanometers to 1.5 microns.

11. The structure of claim 1 further comprising:
a first dielectric layer over the first waveguide core, the first dielectric layer having a planar top surface; and
a second dielectric layer on the planar top surface of the first dielectric layer, the second dielectric layer comprising silicon nitride,
wherein the second dielectric layer is planar.

12. The structure of claim 1 further comprising:
a first dielectric layer over the first waveguide core, the first dielectric layer having a portion with a trapezoidal top surface; and
a second dielectric layer on the portion of the first dielectric layer, the second dielectric layer comprising silicon nitride, and the second dielectric layer has a conformal thickness and a trapezoidal shape.

13. The structure of claim 1 wherein the first waveguide core has an end surface, and further comprising:
a light source positioned adjacent to the end surface of the first waveguide core, the light source configured to provide light in a mode propagation direction toward the edge coupler, wherein the light source is an optical fiber or a semiconductor optical amplifier.

14. The structure of claim 1 wherein the first waveguide core has an end surface, and further comprising:
a light source positioned adjacent to the end surface of the first waveguide core, the light source configured to provide light in a mode propagation direction toward the edge coupler, wherein the light source is a semiconductor laser.

15. The structure of claim 2 wherein the partially overlapping relationship decreases in overlap with increasing distance from an end surface of the first waveguide core.

16. The structure of claim 3 wherein the second waveguide core has a partially overlapping relationship with the first waveguide core.

17. The structure of claim 16 wherein the partially overlapping relationship decreases in overlap with increasing distance from the end surface of the first waveguide core.

18. The structure of claim 10 wherein the second waveguide core has a partially overlapping relationship with the first waveguide core.

19. The structure of claim 10 wherein the first waveguide core has an end surface, and further comprising:
a light source positioned adjacent to the end surface of the first waveguide core, the light source configured to provide light in a mode propagation direction toward the edge coupler.

20. The structure of claim 19 wherein the light source is a semiconductor laser.

* * * * *